United States Patent [19]

Arai et al.

[11] Patent Number: 4,470,076
[45] Date of Patent: Sep. 4, 1984

[54] COLOR VIDEO STILL PICTURE PLAYBACK DEVICE

[75] Inventors: Masaaki Arai; Masahiro Kanbara; Minoru Morio, all of Tokyo, Japan

[73] Assignee: Sony Corporation, Tokyo, Japan

[21] Appl. No.: 409,410

[22] Filed: Aug. 19, 1982

[30] Foreign Application Priority Data

Aug. 21, 1981 [JP] Japan .................................. 56-131912

[51] Int. Cl.³ ............................................. H04N 5/93
[52] U.S. Cl. ..................................... 358/312; 360/35.1
[58] Field of Search ......................... 358/312, 11, 906; 360/10.1, 10.3, 35.1

[56] References Cited

U.S. PATENT DOCUMENTS

| | | | |
|---|---|---|---|
| 4,420,773 | 12/1983 | Toyoda | 360/35.1 |
| 4,423,497 | 12/1983 | Sugiyama | 358/312 |
| 4,426,666 | 1/1984 | Kobayashi | 358/312 |
| 4,430,675 | 2/1984 | Fujine | 360/10.1 |

Primary Examiner—Michael A. Masinick
Attorney, Agent, or Firm—Lewis H. Eslinger; Alvin Sinderbrand

[57] ABSTRACT

Color video still picture playback apparatus enhances the quality of a color still picture reproduced from a video record medium. The reproduced signal is formatted as one field of video containing a succession of lines with first and second color difference signals provided in alternating line sequence. The reproduced picture, after processing, is formatted as alternating first and second fields, each having a plurality of lines such that the lines of the second field are interpolated between successive lines of the first field, and the color difference signals are provided as continuous signals, with interpolated signals being provided in alternate lines. To achieve this, first and second switches operated at the field rate are associated with first and second delay lines of one-half-line and one line delay times, respectively, and an adder circuit connects the outputs of the delay lines to one input of the second switch. This interpolates and half-line-offsets the lines of the video signal to produce the interpolated second field of the luminance signal. Third, fourth, and fifth switches, associated with third, fourth, and fifth delay lines and a second adder circuit interpolate the color difference signals so that outputs of the fourth and fifth switches provide continuous color difference signals. The third switch is operated at the field rate, while the fourth and fifth switches are operated at the line rate.

5 Claims, 3 Drawing Figures

COLOR VIDEO STILL PICTURE PLAYBACK DEVICE

BACKGROUND OF THE INVENTION

This invention relates to apparatus for processing a reproduced video signal, and is particularly directed to an arrangement for playing back a video still picture from a video record medium on which the video picture is recorded as a single video field having a luminance component and first and second color difference signals in alternating line sequence.

There has recently been proposed a hand-held, video still picture camera employing a charged-coupled device (CCD) as a video imager to convert an image of a still-picture "snapshot" into a video signal. The camera also contains a rapidly rotating magnetic film video disc on which each "snapshot" taken by the camera is recorded as one field of a composite color video signal. Magnetic recording apparatus in the camera transfers, for each snapshot, the contents of the CCD imager to the magnetic disc as a circular record track containing the one video field.

Because of resolution limitations of the camera, especially in the CCD imager, only about 240 lines of video are produced for each video picture, rather than the 525 lines of the standard NTSC format or the 625 lines of the standard European formats. Consequently, only a single field containing about 240 lines of video information is recorded on the disc.

In order for an associated playback unit to play back the recorded signal and convert it into a standard format suitable to be displayed on the color CRT of a monitor or standard television receiver, it is desirable to form a second field whose lines are interpolated between corresponding successive lines of the one field that is recorded and played back.

However, in order to present a proper, interlaced standard-format signal, a delay of 0.5 horizontal line intervals must be inserted in the second video field. Also, because the color video signal recorded on the disc has color difference signals recorded in alternating line sequence, the color difference signals from successive lines must be combined in such a way as to provide a continuous chrominance signal and to satisfy the requirements for a standard video format, such as the NTSC format.

OBJECTS AND SUMMARY OF THE INVENTION

It is an object of this invention to provide apparatus for reproducing an excellent color still picture from a recorded video still picture in which a single field of video, including a luminance component and color difference signals in line alternation sequence, is recorded for each picture.

It is another object of this invention to provide apparatus for reproducing color still picture in which a second video field is produced whose lines are interpolated between, and interleaved with, successive lines of the played back single field of video.

According to an aspect of this invention, apparatus are provided for reproducing a color still picture from a recorded composite color video signal stored on a video record medium with the recorded video signal being formatted as one field of video containing a succession of lines of a predetermined line period separated by horizontal synchronizing signals, and a vertical synchronizing signal, the composite color video signal containing a luminance component signal, and first and second color difference signals, such as the red (R-Y) and blue (B-Y) color difference signals, in alternating line sequence, e.g., R-Y, B-Y, R-Y, etc. The reproduced color still picture is formatted as alternating first and second fields each having a plurality of lines such that the lines of the second field are interpolated between, and interlaced with, successive lines of the first field.

In apparatus of this invention, a playback arrangement reproduces the luminance component signal and the first and second color difference signals as a line sequential signal for the one recorded field. A first switch has one input coupled directly to the playback arrangement to receive the luminance component directly, and a second input coupled through a first delay circuit to receive the luminance component delayed by one half line. An output of the first switch is connected to an input of a second delay circuit with a delay of one line, whose output is connected to one of two inputs of a second switch. A first adder has inputs connected to the outputs of the first and second delay circuits, and an output connected to the other of the inputs of the second switch, which has its output supplying a luminance component to an output circuit.

A third switch has two inputs, one of which is coupled directly to the playback arrangement to receive the color difference signals, and the other of which is coupled thereto through a third delay circuit to receive the color difference signals delayed by one-half line. A fourth delay circuit having a delay of one line has its input connected to the output of the third switch and has its output connected to the input of a fifth delay circuit, also with a delay of one line. A second adder has inputs respectively coupled to the output of the third switch and to the output of the fifth delay circuit, and an output. Fourth and fifth switches each have first and second inputs and an output. The first input of the fourth switch and the second input of the fifth switch are joined to the output of the second adder, while the first input of the fifth switch and the second input of thew fourth switch are joined to the output of the fourth delay line. Accordingly, outputs of the fourth and fifth switches provide the color difference signals to the output circuit, which in turn provides a standard-format video signal.

In order to effect proper timing, the first, second, and third switches are changed over at the field rate, while the fourth and fifth switches are changed over at the line rate.

The above and other objects, features, and advantages of this invention will become more fully apparent from a consideration of the ensuing detailed description, which is to be read in connection with the accompanying drawings.

DETAILED DESCRIPTION OF A PREFERRED EMBODIMENT

Figure 1:
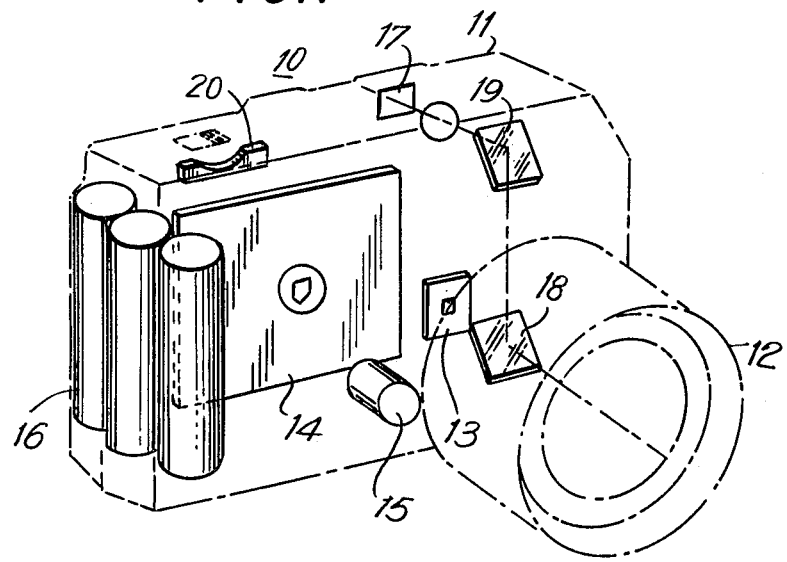
FIG. 1 is a perspective view of an electronic video still camera.

With reference to the drawings, FIG. 1 shows an electronic still camera 10 with which pictures are taken electronically, and are stored on a magnetic record medium, rather than on a conventional photo-sensitive silver-halide film. The camera 10 can conveniently be constructed with a camera body 11 and lens 12 of substantially the same size as those associated with a conventional 35-millimeter SLR. Behind the lens 12 is a charged-coupled device, or CCD imager 13, disposed in the focal plane of the lens 12. This CCD imager 13 has an image area of approximately 6.6 by 8.8 millimeters, and provides a color video signal which is magnetically recorded on a magnetic disc 14, here shown in its protective envelope and disposed at the back of the camera body 11. A motor drive 15 powered by batteries 16 turns the disc 14 at high speed, i.e., at 60 revolutions per second, so that one field of video can be stored on each of up to fifty circular tracks on the magnetic disc 14.

A viewfinder 17 for framing the picture and focusing the lens 12 is provided at the back of the camera body 11 and is optically coupled to the lens by means of first and second mirrors 18 and 19. A shutter release 20 conveniently situated at the top right-hand portion of the camera body 11 releases a shutter mechanism (not shown) which permits light focused at the lens 12 to be incident upon the CCD imager 13.

Figure 2:
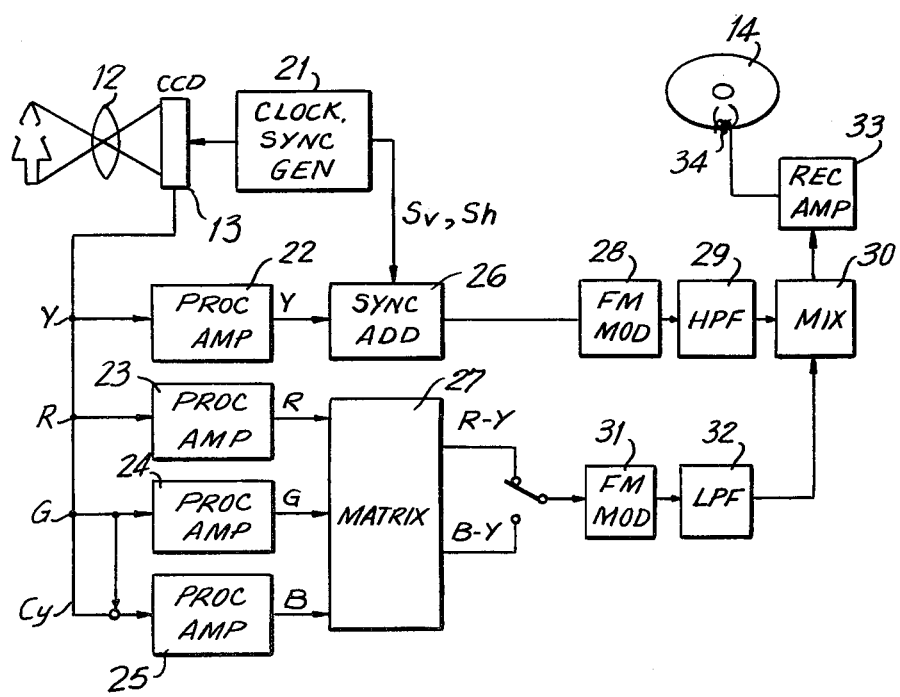
FIG. 2 is a block diagram of a recording processing circuit for use in the electronic video still camera.

A recording circuit coupling the CCD imager 13 and the magnetic disc 14 is shown in the block diagram of FIG. 2. The image is converted in the CCD imager 13 to an electrical signal. In response to a clock signal provided from a clock-and-synch generator 21, the CCD imager 13 provides a luminance signal Y, a red color signal R, a green color signal G, and a cyan color signal $C_y$, which are respectively furnished to a processing amplifiers 22, 23, 24, and 25. In the latter amplifier 26, the green and cyan signals G and $C_y$ are combined subtractively to form a blue signal B.

A sync adder circuit 26 inserts a synchronizing signal supplied by the generator 21 to the luminance signal supplied by the processing amplifier 22. The three color signals R, G, and B are fed to a matrix circuit 27, which provides red and blue color difference signals R-Y and B-Y.

The luminance signal is supplied from the synch adder circuit 26 to an FM modulator 28, and the modulated luminance signal is then filtered in a high pass filter 29 and supplied to a mixer 30. The red and blue color difference signals R-Y and B-Y are supplied alternately, in line sequence, to a FM modulator 31, and the modulated color difference signals are filtered in a low pass filter 32 and thence supplied to the mixer 30. As a result, the mixer 30 supplies a composite color signal through a recording amplifier 33 to a magnetic transducer 34 which records the video signal in a particular circular track on the disc 14. The signal recorded on the disc 14 thus consists of one field (i.e, one-half frame) of video information, in which the color difference signals are recorded in line-sequential alternation.

When it is desired to view the pictures which have been taken and are stored on the magnetic disc 14, the disc 14 can be removed from the camera 10, and placed in a playback unit. Such a playback unit converts the signals recorded on the disc into a viewable picture. The playback unit thus has a disc drive similar to the disc drive 15 of the camera 10, and rotates the disc at a predetermined speed, e.g., 60 revolutions per second.

Because only a single frame is recorded on the disc 14 for each picture, the played-back signal from the playback unit, if continuously reproduced, would have a resolution lower than that of the original signal. In order to improve the vertical resolution therefrom, a second field is generated, in which the lines thereof are interpolated between, and interlaced with, corresponding pairs of successive lines of the one field that is recorded.

Figure 3:
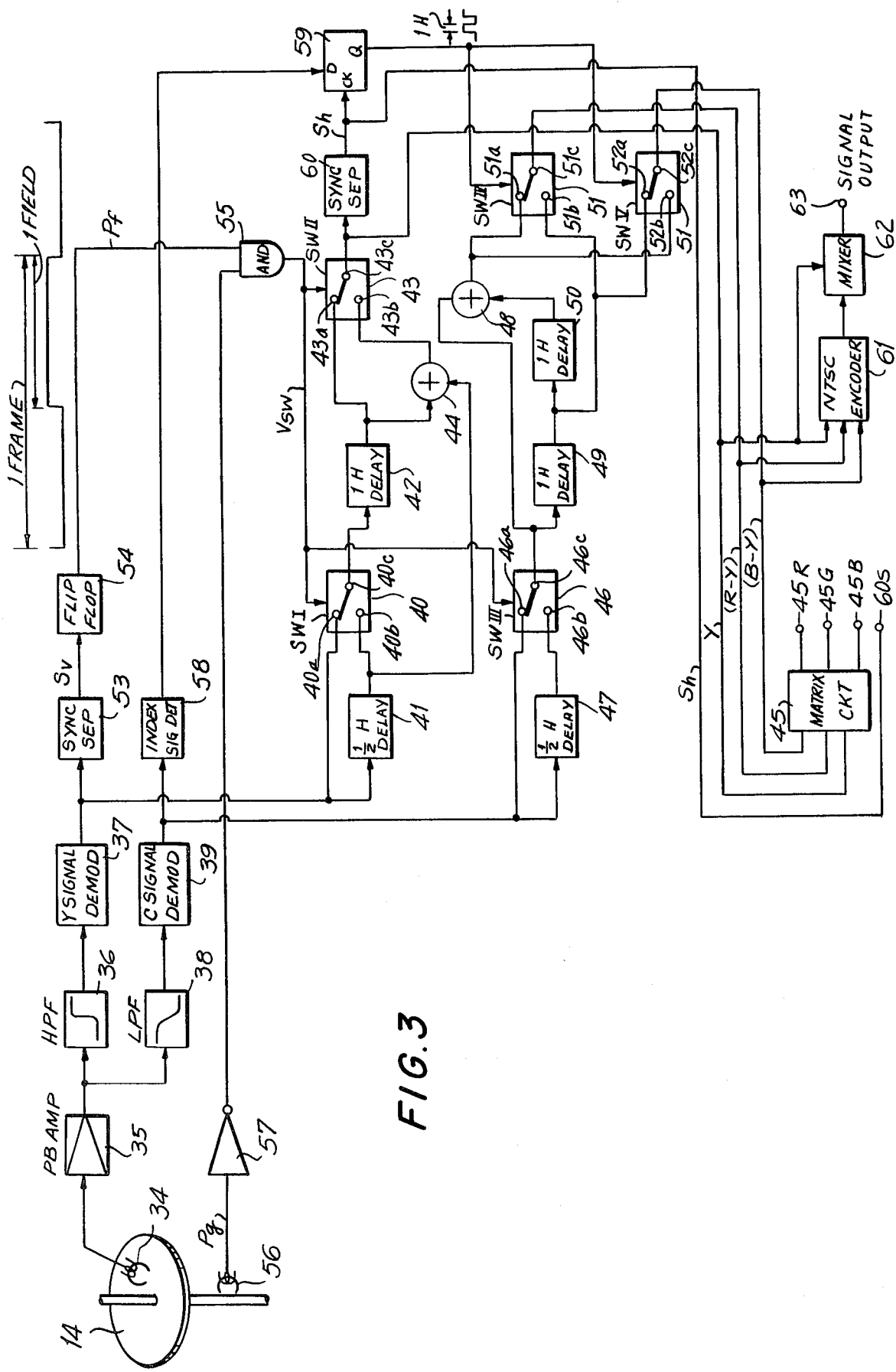
FIG. 3 is a block diagram of reproducing apparatus according to the present invention.

FIG. 3 shows, in block form, the reproducing circuitry of the playback unit according to one embodiment of this invention.

Here, the recorded magnetic disc 14 is rotationally driven at the field rate and a playback head 34', which can be structurally similar to the recording head 34 of the camera 10, picks up the video signal from the desired circular track. This signal is amplified in a playback amplifier 35, is furnished through a high pass filter 36 to a luminance signal demodulator 37, and is also supplied through a low pass filter 38 to a chrominance signal demodulator 39. The latter furnishes the red and blue color difference signals R-Y and B-Y in line alternation.

A first switch 40 has a pair of inputs 40a and 40b and an output 40c. The luminance signal demodulator 37 supplies the luminance signal directly to one input 40a of the first switch 40, and through a first delay circuit 41 of one half-line period delay time to the other input 40b thereof. The output 40c of this first switch 40 is coupled to the input of a second delay circuit 42, which has a delay time of one horizontal line. A second switch 43 has first and second inputs 43a and 43b and an output 43c, with the first input 43a being connected to the output of the delay circuit 42. A first adder circuit 44 has inputs respectively coupled to the outputs of the first and second delay circuits 41 and 42, and has an output connected to the second input 43b of the second switch 43c. The first and second switches 40 and 43 are switched over at the field rate, so that at the output 43c of the second switch 43 there appear alternating first and second fields of the luminance signal Y, in which the lines of the second field are interpolated between the lines of the first field. This luminance signal Y is furnished to a matrix circuit 45.

A third switch 46 also has first and second inputs 46a, 46b, and an output 46c, with the chrominance signal demodulator 39 supplying the color difference signals R-Y and B-Y directly to the first input 46a and through a third delay circuit 47, of one-half horizontal line delay time, to the second input 46b. This switch 46 is also switched over at the field rate.

The output 46c of the third switch 46 is connected to one input of a second adder circuit 48, and is also coupled through a series arrangement of a fourth delay circuit 49 and a fifth delay circuit 50, each of one horizontal line period delay time, to another input of the second adder circuit 48. A fourth switch 51 and a fifth switch 52, which are switched over at the line rate, each have respective first and second inputs 51a, 51b and 52a, 52b, and a respective output 51c and 52c. The first output 51a of the fourth switch 51 and the second input 52b of the fifth switch 52 are both joined to the output of the second adder circuit 48, while the first input 52a of the fifth switch and the second input 51b of the fourth switch are both joined to the output of the fourth delay circuit 49. At each of the respective outputs 51c and 52c of the fourth and fifth switches 51 and 52, there appear continuous red and blue color difference signals R-Y and B-Y.

The processing of the color difference signals through the two successive one-horizontal-line-period delay circuits 49 and 50 and the second adder 48 results in an interpolated version of the color difference signals R-Y and B-Y being provided during alternate line intervals, while the output of the fourth delay circuit 49 provides uninterpolated color difference signals R-Y and B-Y during the remaining line intervals. These continuous color difference signals R-Y and B-Y are provided to the matrix circuit 45, which then decodes the luminance signal and the color difference signals to provide red, green, and blue signals at respective outputs 45R, 45G, and 45B, thereof.

The adder circuits 44 and 48 can include attenuators so that the combined signals appearing at their outputs have an amplitude that is the average of the input video signals applied thereto.

The switching over of the first, second, and third switches 40, 43, and 46 is effected as follows.

A synchronizing signal separator 53 separates a vertical synchronizing pulse signal $S_v$ from the demodulated luminance signal, and this synchronizing signal $S_v$ is used to trigger a flip flop 54. This flip flop 54 provides at its output a square wave $P_f$ which has a period of one frame, to one input of an AND gate 55. A pulse generator 56 associated with the drive mechanism for the disc 14 provides one output pulse for each revolution of the rotating magnetic disc 14. This pulse $P_g$ is amplified in an inverting amplifier 57, and the resulting inverting signal is then furnished to another input of the AND gate 55. The AND gate 55 then supplies a switching signal $V_{sw}$ to control terminals of the first, second, and third switches 40, 43, and 46, which switching signal $V_{sw}$ is synchronized with the rotation of the disc 14.

The switching over of the fourth and fifth switches 51 and 52 is carried out as follows.

An index signal detector 58 coupled to the chrominance signal demodulator 39 detects an index signal which, for example, is characteristic of the onset of the R-Y color difference signal. When this index signal is detected, the detector 58 furnishes a pulse signal to a D input terminal of a D-type flip flop 59. At the same time, a horizontal synchronizing signal separator 60 coupled to the output 43c of the second switch 43 furnishes horizontal synchronizing pulses $S_h$ to a clock input CK of the flip flop 59. As a result, this flip flop 59 provides, from its output Q to control terminals of the switches 51 and 52, a square wave which has a two-line period. The synchronizing signal separator 60 also furnishes the horizontal synchronizing signal $S_h$ to a synchronizing signal output terminal 60s.

In addition, the luminance signal Y and the color difference signals R-Y and B-Y are also furnished to an NTSC encoder 61 which serves to convert the signals into a standard format which can be presented to a color television receiver. In this case, a mixer circuit 62 following the NTSC encoder 61 serves to combine the luminance signal Y synchronizing signals $S_h$ and $S_v$ to the encoded color video signal, which is then furnished as a composite color signal to a signal output terminal 63.

The operation of the reproducing apparatus of this invention can be explained as follows:

In the first field, the outputs 41c, 43c and 46c of the first, second, and third switches 41, 43, and 46 are connected to the associated first inputs 40a, 43a, and 46a, respectively. At this time, the luminance signal Y obtained from the demodulator 37 is supplied through the first switch 40, is delayed by one horizontal line period, and is supplied through the second switch 43 to the matrix circuit 45. At the same time, the line-sequential signal derived from the chrominance demodulating circuit 39 is supplied to the output 46c of the third switch 46. Accordingly, in this field, during odd line periods, the first inputs 51a and 52a of the switches 51 and 52 are connected to the respective outputs 51c and 52c so that a so-called interpolated R-Y color difference signal is furnished from the output of the fourth switch 51, while an uninterpolated B-Y color difference signal, delayed by one horizontal line period, is provided from the output 52c of the fifth switch 52. In the even horizontal periods, when the outputs 51c and 52c of the fourth and fifth switches 51 and 52 are connected to the respective second inputs 51b and 52b, the output 51c of the fourth switch 51 provides an uninterpolated R-Y color difference signal, while the output 52c of the fifth switch 52 provides an interpolated B-Y color difference signal. Since the interpolated and uninterpolated R-Y and B-Y color difference signals are provided in turn from the respective fourth and fifth switches 51 and 52, continuous color difference signals R-Y and B-Y are provided to the matrix circuit 45.

During the second field, the first, second, and third switches 40, 43, and 46 are switched over to connect the second inputs 40b, 43b, and 46b to their respective associated outputs 40c, 43c, and 46c. Consequently, because the luminance signal Y supplied to the matrix circuit 13 is delayed by one-half horizontal period in the delay circuit 41 and is combined with a further-delayed version thereof furnished from the delay circuit 42, the lines of the luminance signal from the second field have a so-called interlace scan relationship with the first field, and the lines of the second field are interpolated between successive lines of the luminance signal of the first field.

Also during the second field, the third delay circuit 47 acts to compensate the B-Y and R-Y color difference signals by one half horizontal line period. However, during this second field, the R-Y and B-Y color difference signals are processed in the same manner as in the first field. These signals, including the luminance signal Y, and the color difference signals R-Y and B-Y, are all supplied to the matrix circuit 45 so that high quality red, green, and blue output signals can be derived from the terminals 45R, 45G, and 45B, respectively. As the operation described hereinabove is repeated sequentially, a color still picture can be obtained from these terminals 45R, 45G, and 45B, if processed in conjunction with the synchronizing signals appearing at the terminal 60s. This picture can easily be displayed on a conventional color monitor.

It should be understood from the foregoing that an excellent color still picture can be obtained by processing of the luminance signal Y and the line-sequential color difference signals R-Y and B-Y for a single field. That is, because of the interpolation achieved for the color difference signals R-Y and B-Y and for the luminance signal Y, a full frame (i.e., two-field) color still picture, with excellent vertical resolution, is obtained.

Furthermore, while in the circuit of this invention the interpolation of the color difference signals R-Y and B-Y is carried out using two delay circuits 49 and 50 and the luminance signal is interpolated using a separate delay circuit 42, it is also possible to interpolate both the color difference signals R-Y and B-Y and the luminance signal Y together in common delay circuits, thereby reducing the number of the rather expensive delay circuits which are required.

Furthermore, while in the above-described embodiment R-Y and B-Y color difference signals are employed, it is possible to use other signals as the color components, such as the R-G and B-G color difference signals, or Q and I color components. Also, while an NTSC encoder 61 is shown, it is also possible to use a PAL or a SECAM encoder.

Moreover, it will be apparent to those of ordinary skill that many possible modifications and variations to the embodiment described in detail hereinabove are possible without departure from the scope and spirit of this invention, which is to be defined by the appended claims.

What is claimed is:

1. Apparatus for reproducing a color still picture from a recorded composite color video signal stored on a video record medium with the recorded video signal being formatted as one field of video containing a succession of lines of a predetermined line period separated by horizontal synchronzing signals, and a vertical synchronizing signal, the composite color video signal containing a luminance component signal, and first and second color difference signals in alternating line sequence, and with the reproduced color still picture being formatted as alternating first and second fields each having a plurality of lines such that the lines of the second field are interpolated between and interlaced with successive lines of the first field; comprising playback means for reproducing the luminance component signal and the first and second color difference signals as a line sequential signal for said one field;

first switch means coupled to said playback means having two inputs, a switched output, and a control terminal, with the luminance component signal being applied directly to one of said inputs;

a first delay circuit having a delay of one-half line period with an input and an output coupled to said playback means and the other of the inputs of said first switch means, respectively;

a second delay circuit having a delay of one line period with an input coupled to the switched output of the first switch means and an output;

second switch means having two inputs, a switched output, and a control terminal, with one of said inputs connected to the output of the second delay circuit;

a first adder circuit having inputs coupled to the output of the first and second delay circuits and an output connected to the other input of said second switch means;

third switch means having two inputs, a switched output, and a control terminal, with the color difference signals being applied directly to one of said inputs;

a third delay circuit having a delay of one-half line period with an input and an output coupled to the playback means and the other input of said third switch means, respectively;

a fourth delay circuit having a delay of one line period with an input connected to the output of said third switch means and an output;

a fifth delay circuit having a delay of one line period and having an input connected to the output of the fourth delay circuit and an output;

a second adder circuit having inputs connected to the output of the third switch means and the output of the fifth delay circuit, respectively, and an output;

fourth switch means having two inputs, a switched output, and a control terminal, one of said inputs being connected to the output of said second adder circuit and the other of said inputs being connected to the output of said fourth delay circuit;

fifth switch means having two inputs, a switched output, and a control terminal, one of said inputs being connected to the output of said fourth delay circuit and the other of said inputs being connected to the output of said second adder circuit;

means supplying a first switching signal to the control terminals of said first, second, and third switch means to connect the outputs thereof to the one associated inputs during said first fields, and to the other associated inputs during said second fields;

means supplying a second switching signal to the control terminals of said fourth and fifth switch means to connect the outputs thereof to the one associated inputs during alternating lines periods and to the other associated inputs during the remaining line periods; and output signal processing means having inputs connected to the outputs of said second, fourth, and fifth switch means and an output providing the reproduced color video signal.

2. Apparatus for reproducing a color still picture according to claim 1; wherein said output signal processing means includes encoder means for combining the luminance component signal and the reproduced first and second color difference signals as a standard-format composite color signal.

3. Apparatus for reproducing a color still picture according to claim 1; wherein said output signal processing means further includes mixer means following said encoder means for adding the synchronizing signals to said composite color video signal.

4. Apparatus for reproducing a color still picture according to claim 1, wherein said means supplying said first switching signal includes synchronizing signal separator means providing said vertical synchronizing signal, and a bistable circuit triggered by said vertical synchronizing signal.

5. Apparatus for reproducing a color still picture according to claim 1, wherein said means supplying said second switching signal includes syhchronizing signal separating means providing said horizontal synchronizing signals, index signal detector means detecting an index signal present at a predetermined location in each of at least predetermined lines of the video signal; and a D-type flip flop having a data terminal coupled to the index signal detector means, a clock terminal coupled to said synchronizing signal separating means, and an output providing said second switching signal.

* * * * *